United States Patent [19]
Kline et al.

[11] 4,026,528
[45] May 31, 1977

[54] FEED MATERIAL MIXING APPARATUS

[75] Inventors: Charles M. Kline, Reinholds; Thomas W. Waldrop, New Holland, both of Pa.

[73] Assignee: Sperry Rand Corporation, New Holland, Pa.

[22] Filed: Feb. 23, 1976

[21] Appl. No.: 660,204

[52] U.S. Cl. .................................. 259/7; 259/97
[51] Int. Cl.² .......................... B01F 5/12; B01F 7/24
[58] Field of Search ............... 259/6, 7, 8, 21–24, 259/41–44, 97; 241/101 B, 101.5, 101.6

[56] References Cited

UNITED STATES PATENTS

| | | | |
|---|---|---|---|
| 1,576,018 | 3/1926 | Wolf | 259/97 X |
| 1,707,999 | 4/1929 | Snyder | 259/23 |
| 2,896,923 | 7/1959 | Luscombe | 259/8 |
| 3,133,727 | 5/1964 | Luscombe | 259/8 |
| 3,185,449 | 5/1965 | Kasten | 259/6 |
| 3,369,762 | 2/1968 | Buzenberg et al. | 241/63 |
| 3,589,684 | 6/1971 | Dixon | 259/97 |
| 3,667,734 | 6/1972 | Skromme et al. | 259/44 |
| 3,780,993 | 12/1973 | Kline | 259/97 |
| 3,840,189 | 10/1974 | Kanengieter et al. | 241/101 B X |

OTHER PUBLICATIONS

"Brady Hydra–Mills", Brochure No. 15D472NWC, Koehring Farm Division.

Primary Examiner—Philip R. Coe
Attorney, Agent, or Firm—Frank A. Seemar; Michael R. Swartz; Joseph A. Brown

[57] ABSTRACT

Mixing apparatus having a frame on which a vertical mixing tank is mounted. The tank has a cylindrical upper section and a conical downwardly converging lower section. A hammermill is carried on the frame and provided with a hopper to receive feed material. Different types of feed material are fed into the hopper and chopped as they pass through the hammermill. A transfer auger conveys chopped material from the hammermill to the tank. Other feed material may be added during the mixing operation by introduction thereof via a second auger conveyor. A mixing assembly within the tank circulates the various feed material in a circuitous path to produce a well mixed homogeneous mass. A third auger conveyor, utilized to unload the tank, is mounted coaxially with the second feed auger and communicates with the bottom of the tank through an appropriate opening. The mixing assembly includes a vertical auger having a frusto-conical shaped lower core portion mounted for rotation opposite the conical wall section to form a trough-like area at the bottom of the tank chamber.

6 Claims, 3 Drawing Figures

FEED MATERIAL MIXING APPARATUS

CROSS REFERENCE TO RELATED APPLICATIONS

Reference is hereby made to the following co-pending U.S. applications dealing with related subject matter, assigned to the assignee of the present invention and filed on or about the same date as the present invention.
1. "Improved Material Advancing Means for a Grinder-Mixer" by Charles M. Kline, Ser. NO. 660,602, filed Feb. 23, 1976 (now U.S. Pat. No. 3,997,146)
2. "Improved Feed Material Mixing Apparatus" by Charles M. Kline and Thomas W. Waldrop, Ser. No. 606,212, filed Feb. 23, 1976.

BACKGROUND OF THE INVENTION

The present invention relates to material handling apparatus and more particularly to an improved agricultural feed grinding and mixing machine.

Most present day agricultural fed grinding and mixing machines, commonly referred to as grinder-mixers, comprise a vertical mixing assembly mounted concentrically within a mixing tank having a cylindrical upper section and a frusto-conical shaped downwardly converging lower section. The mixing assembly includes a centrally located upright mixing auger rotatably mounted within a tubular housing and having inlet and discharge openings at its upper and lower ends, respectively. During a mixing operation, feed material is conveyed in a generally circuitous path. The mixing assembly continually transfers material from the bottom of the tank upwardly through the auger housing to the top of the tank whereupon it is discharged through the upper opening and allowed to gravitate back down toward the lower portion of the mixing tank. Commercially available apparatus of this type is illustrated by U.S. Pat. No. 3,780,993 issued Dec. 25, 1973, to Charles M. Kline, one of the joint inventors of the present invention.

The conical section of the mixing tank configuration of the grinder-mixer described above functions to direct material inwardly towards the central mixing auger as it settles or gravitates downwardly during circulation. Since the horizontal cross section of the tank decreases substantially as the walls converge inwardly, the material is compressed as it settles causing certain feed materials, especially those being processed under moist and/or extremely soggy conditions, to form a cluster of relatively dense material. This is illustrative of a common problem during operation of commercially available grinder-mixer machines having conventional conical shaped lower sections. Material moving downwardly in the tank tends to build up in the area between the lower wall so the tank and the auger housing. This buildup, commonly referred to as "bridging," restricts free downward flow of material and thereby impedes a smooth circuitous flow of material which in turn diminishes the overall machine effectiveness. Certain crop conditions lead to more frequent bridging and many times shutdown is necessary to permit manual removal of material from plugged areas.

One prior art arrangement that overcomes the problem of bridging in the lower tank is shown in U.S. Pat. No. 3,780,993, mentioned above. In this arrangement, the central mixing auger includes a lower section of flighting having relatively wide outside dimensions. This configuration is designed to more effectively advance material contained in the lower portion of the tank and thereby obviate the forming of clusters of material in the vicinity of the lower sidewalls of the mixing tank. Although this type of auger has been generally successful, the overall efficiency of the mixing apparatus drops off under conditions where the feed material being processed is wet and soggy. This patent also features a auger provided with a plurality of outwardly projecting extensions on its lower wide diameter flighting. As the central mixing auger is rotated, the outwardly projecting extensions engage and agitate surrounding material to break up clusters in the vicinity of the auger and permit material being mixed to gravitate more freely to the base of the tank. Consequently, the extensions further enhance overall circulation of feed material within the tank during a mixing operation. Althought this feature improves mixing capability under adverse conditions, it tends to create turbulence during circulation of dry crop materials prevalent in some geographical regions.

Another prior art approach that has been proffered as a solution to the problem of bridging in the lower tank portion of grinder-mixers is disclosed in U.S. Pat. No. 3,667,734, to A. D. Skromme et al, issued June 6, 1972. In this patent, the walls of the grinder-mixer are vertical and the material that gravitates to the bottom of the mixing chamber during operation is engaged by the blade of a long sweep arm rotating with and extending outwardly from the auger shaft. The arm sweeps through a path parallel to and encompassing the entire bottom of the tank. A similar sweep arm is employed in the vertical mixing tank disclosed in U.S. Pat. No. 1,576,018, issued Mar. 9, 1926, to R. B. Wolf. Although the vertical walls in this type of apparatus eliminate the problems caused by convergence at the lower portion of the mixing chamber, an inherent shortcoming of this type of apparatus is the tendency of material to wedge under the sweep arm causing an upward force component with obvious deleterious effects. This problem is apparently not alleviated when a guide is used to restrain the outer end and, in fact, the problem would seen to be compounded due to the tendency toward bridging between the sidewall and any ledge-like surface extending therefrom. A further disadvantage experienced during use of vertical sidewall type configurations is the need for a head of pressure, without which the sweep arm has a tendency to merely slide under the material without changing its relative position in the tank, especially during partial load conditions. This disadvantage is even more prevalent at the end of an unloading operation, i.e., where the weight of the load affects the ability of the sweep arm to impart a radial force to urge material toward an unloading port. Thus, the sweep arm operates best under full load conditions but conversely, the effects of wedging increase proportionately with the load.

There exists still another prior art approach to the problem of bridging in grinder-mixers having a conventional inverted conical-shaped lower tank portion inclined inwardly toward the central mixing auger assembly. For example, apparatus is sold by the Koehring Farm Division of Des Moines, Iowa, wherein the mixing assembly comprises an upper auger portion rotatable with a lower auger portion having an inverse frusto-conical shaped core section. In this arrangement the inclined wall commences at the approximate center of the tank and the bottom of the tank is completely covered by the lower core section, as shown and described in Koehring brochure No. 150472 NWC. A similar configuration is disclosed in U.S. Pat. No. 3,589,684, issued on June 29, 1971, to Bernard Dixon. The Dixon patent also shows a mixing tank with a vertical mixing assembly having a frusto-conical shaped lower core section covering the entire bottom and on a common shaft with an upper cylindrical auger. Both the upper and lower auger sections are concentrically journalled in the tank for rotation within a housing that is flared at the bottom in a shape adapted to accommodate the lower conical portion of the auger. In Koehring the auger tube does not include a flared portion at the lower end thereof, and thereby exposes the conical portion of the auger directly to the material sliding downwardly along the inclined tank wall.

In the Dixon arrangement, even though the flared enclosure has slotted apertures the conical portion of the housing would tend to cause bridging between it and the tank wall due to the convergence of material with no means to rapidly take it away. Bridging problems are exceptionally acute under conditions where crop material is damp as is the case in many areas of the world where grinder-mixers are employed. In the Koehring arrangement without a flared housing portion, even though material is allowed to contact the conical auger prior to reaching the bottom part of the tank, bridging problems due to the diminishing area between the auger housing and downwardly inclined tank wall are still of concern.

SUMMARY OF THE INVENTION

It is, accordingly, the principal object of the present invention to provide a material handling apparatus in which the aforementioned problems of the prior art have been overcome. More particularly, it is an object to provide an improved agricultural feed grinding and mixing machine in which bridging of the feed material during the mixing process is substantially reduced and the material is more thoroughly and uniformly mixed.

It is a further object to provide more efficient mixing apparatus in which the circulation frequency during the mixing process is improved without affecting performance and capacity and which is relatively inexpensive and requires a minimum amount of power.

Still a further object is to provide a machine for grinding and mixing feed in which the tank is designed to rapidly unload the mixed material as well as effectively circulate material during a mixing process.

In pursuance of these and other objects, the present invention contemplates new and improved grinder-mixer apparatus having a tank in which the lower section thereof is formed in a trough-like manner and the tank bottom includes unobstructed openings disposed or passing material during loading and unloading operations. In one embodiment the mixing apparatus more particularly contemplates a frame for supporting a tank having a top, a bottom and outer walls for confining the feed material therewithin during a mixing process. The tank comprises a first cylindrical section and an integral second frusto-conical shaped section extending downwardly and inwardly from the cylindrical section. The bottom of the tank is provided with first, second and third openings. First and second transfer augers convey material from material receiving hoppers to the tank via the first and second openings while a third transfer auger conveys material away from the tank via the third opening. In one novel arrangement, the third auger is mounted coaxially with the second transfer auger. A vertical mixing assembly provided within the tank cooperates with the unique tank structure to effect mixing of material fed into the tank. The mixing assembly includes a vertical auger housing and rotatably mounted material advancing means having first and second augering portions. The lowermost auger portion comprises a frusto-conical core mounted for rotation within and adjacent to the lower section of the tank whereby a trough-like area is formed in the bottom of the tank, at the bottom of which said first, second and third openings are disposed free of obstruction for transferring material to and from the tank during a mixing process.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
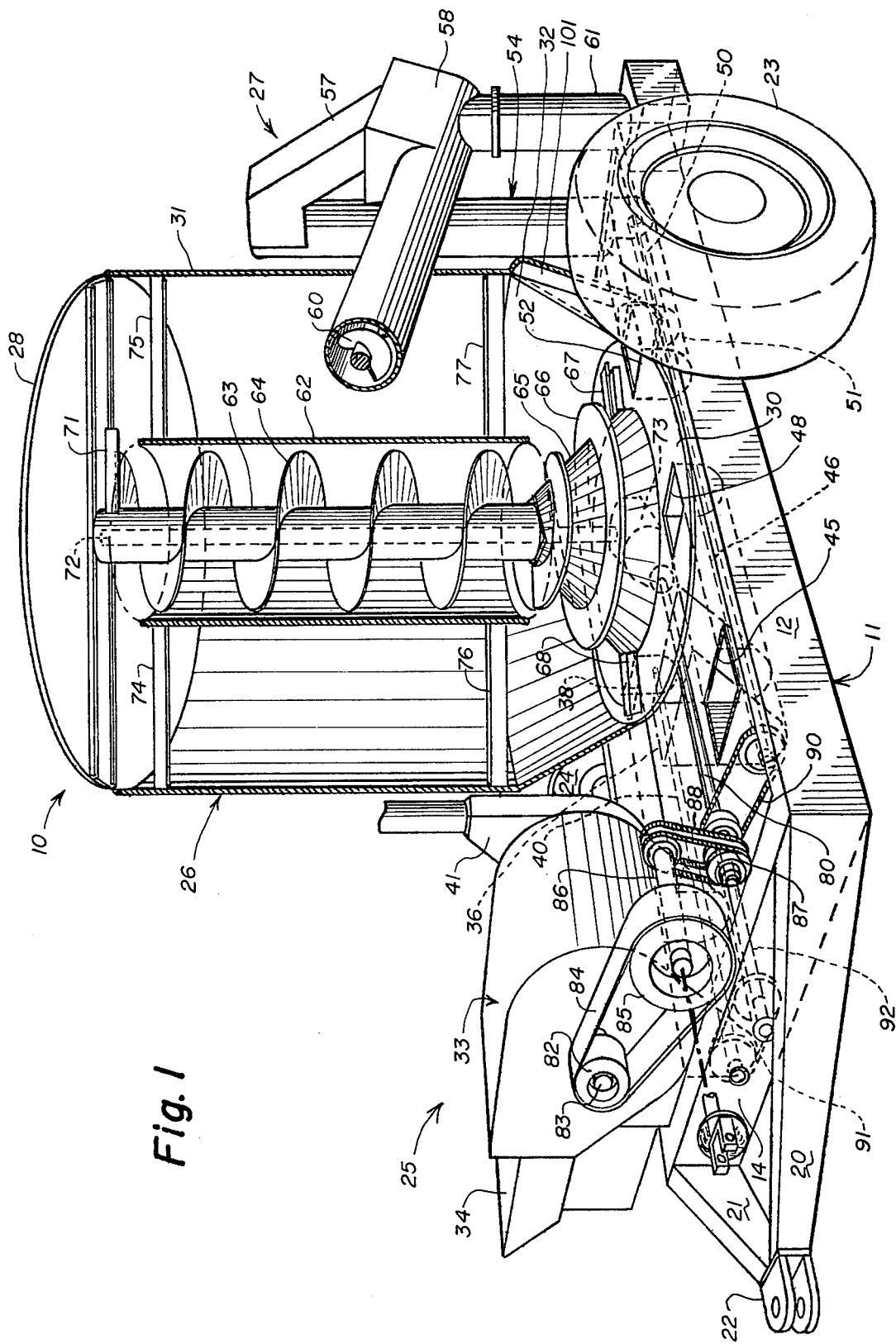
FIG. 1 is a diagrammatic perspective view of a portable grinder-mixer with portions cut away to illustrate a machine embodying the present invention.

Referring to the drawings for a more detailed description, a grinder-mixer, generally designated by reference numeral 10, is shown in FIG. 1 to illustrate by way of example one embodiment of equipment in which the present invention may be employed. The grinder-mixer 10 comprises a generally fore-and-aft main frame 11 having parallel side members 12 and 13, front and rear cross support means 14 and 15, respectively, a plurality of intermediate support members 16, 17 and 18 (see FIG. 2), and forwardly converging members 20 and 21. A clevis 22, formed at the front of converging members 20 and 21, is adapted to be connected to a drawbar of a tractor (not shown) such that the grinder-mixer may be readily towed from one place to another during which ground engaging support is provided by a pair of wheels 23 and 24. Mounted on main frame 11 is an input section 25, a mixing assembly 26 for mixing material received in section 25 and an unloading assembly 27 for unloading mixed material after the mixing operation is completed. The mixing assembly includes a tank having a top 28, a bottom 30 and an outer wall comprising an upper cylindrical section 31 and a lower frusto-conical shaped section 32 extending inwardly and downwardly terminating near bottom 30 of the tank.

The crop input section is disposed forwardly of the tank and includes a hammermill 33 secured to th main frame. The hammermill, not shown in detail, is of a conventional grinder-mixer type which functions to initially grind feed material prior to being transferred to the mixing tank. In the present invention feed material is fed into a hammermill hopper 34 and ground by hammermill 33, including a plurality of rotating hammer elements 35 (shown in phantom in FIG. 3), during which grinding operation a substantial portion of the ground feed is allowed to gravitate into a transfer auger 36 (only partly depicted in FIG. 1) which conveys the ground feed material from hammermill 33 into the mixing tank, via paddles 37 (see FIG. 2) disposed opposite an opening 38 in bottom 30 of the tank. The paddles 37 are mounted on transfer auger shaft 40 and receive material being conveyed in a generally axial direction and throw it upwardly into the tank. That portion of the ground material which too fine to gravitate into transfer auger 36 is captured in an airstream produced by fan 41 and conveyed upwardly through vertical pipe 42 into a cyclone-type dust collector 43 which functions in a well known manner to centrifugally separate feed material from the air. Feed material separated by dust collector 43 is allowed to gravitate downwardly into the transfer auger 36 via a return pipe 44, shown in FIG. 3 of the drawings, extending vertically along the right side of the cylindrical section of the tank. In this description, right hand and left hand references are determined by standing to the rear of the portable grinder-mixer and facing the direction of conventional travel.

During normal grinder-mixer operation, it is not uncommon to introduce supplemental feed concentrates to the ground material being mixed in the tank. These feed supplements include high protein additives, minerals, salt, or the like, depending on the end use. Accordingly, the crop input section is provided with a feed concentrate hopper 45 through which concentrated feed additives may be selectively introduced. The additives gravitate to the bottom of concentrate hopper 45 and are conveyed via an auxiliary transfer auger 46 and paddles 47, through opening 48 to the tank in a manner similar to that by which material is conveyed to the tank by main transfer auger 36.

Unloading assembly 27 comprises a horizontal discharge auger 50 (only partly depicted in FIG. 1) rotatably mounted in a trough 51 communicating with the tank via opening 52 in bottom 30. The assembly further comprises a vertical discharge auger 53 rotatably mounted within an upright tube 54 communicating at its lowermost end with the rear portion of trough 51. Hereagain radially extending paddles 55 (see FIG. 2) on the shaft of auger 50 assist in the transfer of material from trough 51 to tube 54. Material carried upwardly by vertical discharge auger 53 is thrown outwardly by paddle assembly 56 (see FIG. 3) whereupon it is conveyed downwardly along discharge spout 57 to a unloading auger hopper 58 and thence to a transverse auger 60 in communication with such unloading auger hopper. Transverse auger 60 and auger hopper 58 are supported by cylindrical housing 61 through which suitable drive means for transverse auger 60 are provided. Although not specifically shown, transverse auger 60 and unloading auger hopper 58 are pivotally mounted about vertical and transverse axes such that the transverse auger is movable sideways and up and down during a unloading operation. The unloading portion of the discharge auger assembly, which does not form a material part of the present invention, can best be appreciated from a study of U.S. Pat. No. 3,638,816 issued Feb. 1, 1972, to William W. Mann and assigned to the assignee of the present application.

Figure 2:
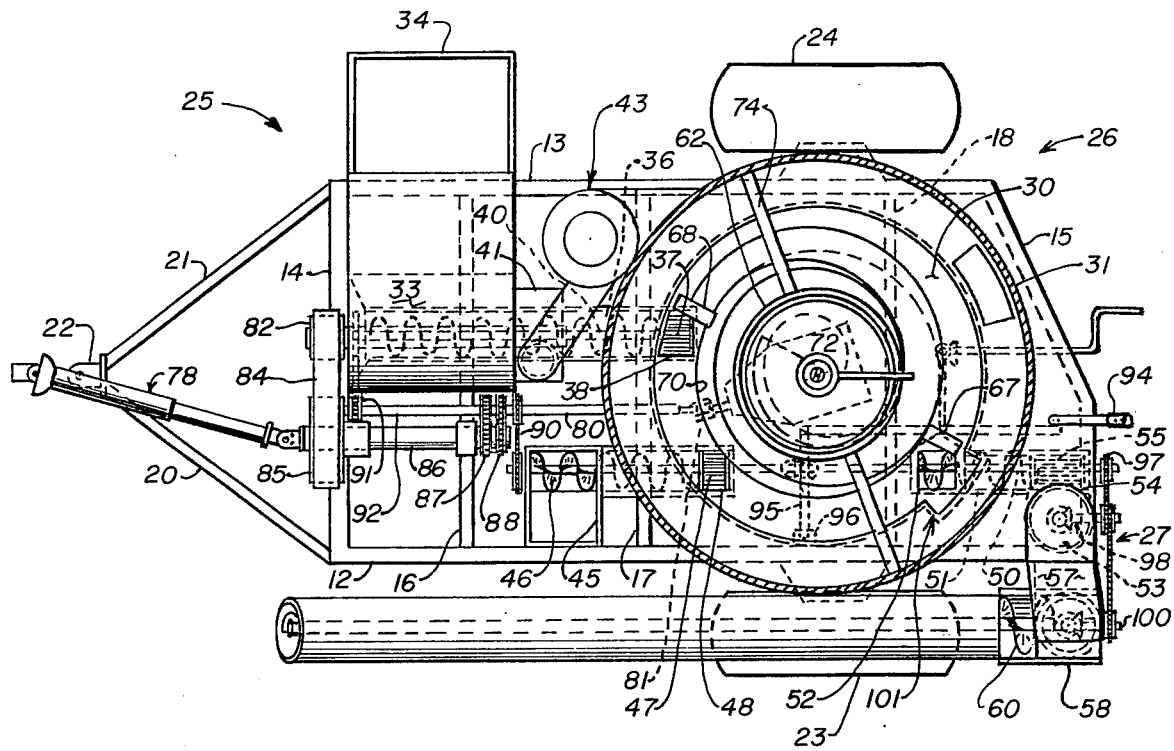
FIG. 2 is a plan view taken along lines 2—2 of FIG. 3, showing in more detail the machine shown in FIG. 1.
Figure 3:
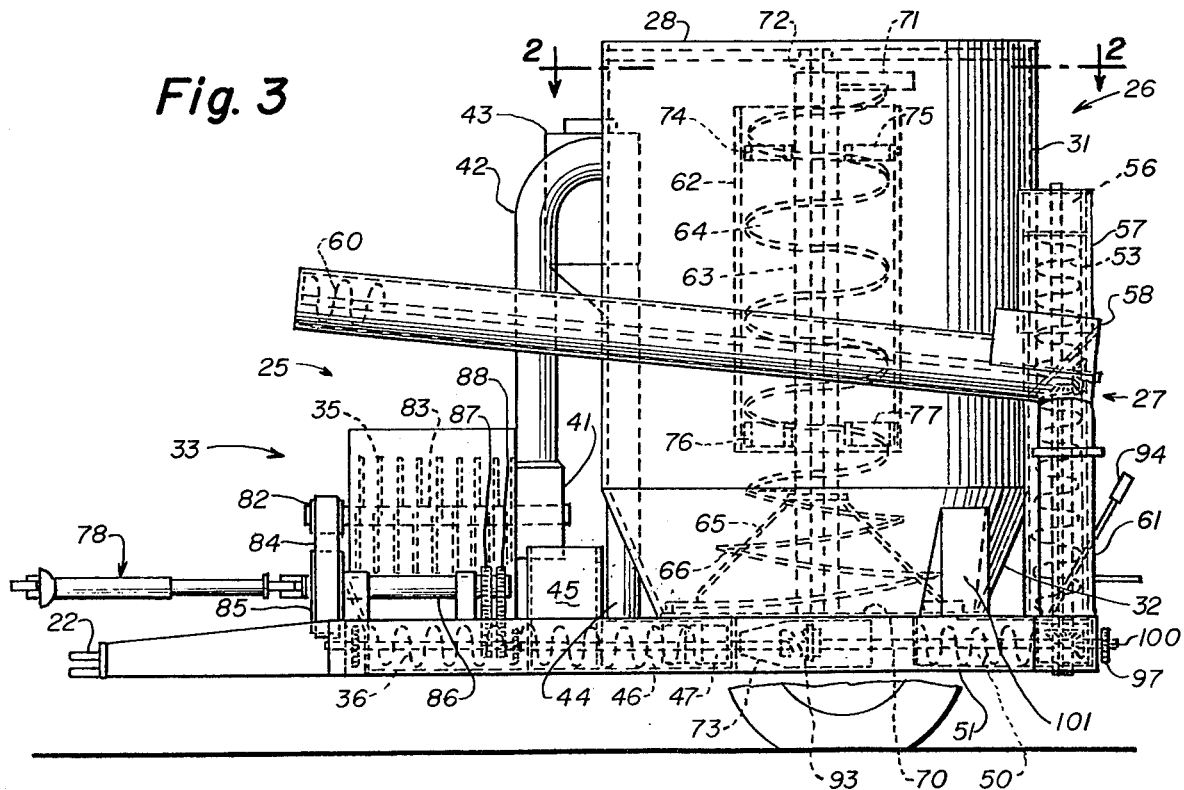
FIG. 3 is a side elevational view of the machine shown in FIG. 2.

Now turning to mixing assembly 26, centrally located within the tank, it will be noted that it comprises a rotatably mounted material advancing assembly disposed coaxial with a tubular auger housing 62. The material advancing assembly more specifically includes first and second material advancing portions, the first of which comprises a vertical auger having a tubular core 63 and constant pitch spiral flighting 64 extending outwardly therefrom. The second and lowermost portion of the material advancing assembly consists of a frusto-conical shaped core member 65 and spiral flighting 66 wound upwardly and extending outwardly therefrom. Rigid crop engaging elements 67 and 68 extend outwardly from the circular lower edge 70 of the core member 65. The spiral flighting 66 commences from the trailing edge of riged crop engaging element 68 and increases in pitch and width as it advances upwardly to terminate adjacent the top edge of frusto-conical shaped core member 65. Spiral flighting 64 on the upper portion of the rotatably mounted material advancing assembly commences at the termination of spiral flighting 66 and likewise tubular core 63 commences from and has a like diameter as the circular top edge of core 65. Generally, the rotatably mounted material advancing assembly provides auger flighting would upwardly from the bottom portion of the mixing tank to the upper portion thereof and, in terms of function, acts to continually advance material from the bottom of the tank to the top. When the material being carried upwardly in housing 62 reaches the top, it is discharged outwardly through the space between auger housing 62 and top 28 which material thereupon gravitates back downwardly toward the lower portion of the tank. As shown in FIGS. 2 and 3, a radially extending paddle 71 is affixed to the top edge of flighting 64 to assist in the discharge of material from housing 62.

Viewing the centrally located vertical mixing assembly in more detail, it will be seen further in FIGS. 2 and 3 that the first and second portions are mounted fro rotation on a internally supported upright shaft 72 centrally disposed in the tank. The shaft, rotatably driven via gearbox 73, is journalled in any suitable bearing means within the tank. The vertical auger housing 62 is affixed to the tank by pairs of upper and lower connecting rods 74,75 and 76,77, respectively, extending radially between the housing and the inner surface of the upper cylindrical section of the tank.

As seen in FIG. 3, lower frusto-conical shaped section 32 of the tank forms a trough-like area in the bottom of the tank by virtue of its relationship with frusto-conical shaped core 65 of the lower portion of the material advancing assembly. This circular shaped trough is further defined by the exposed ring-shaped portion of the bottom of the tank within the circular intersection between the bottom edge of the frusto-conical shaped wall and the bottom and the concentric projection of the bottom edge of core member 65. The upper limits of such trough are defined by an imaginary horizontal plane through the approximate intersection between the cylindrical section of the tank walls and the lower frusto-conical shaped section of the tank, which plane passes through the material advancing assembly in the general vicinity of intersection between lower frusto-conical core member 65 and tubular core member 63. This trough-like area, which is at the heart of the invention, extends upwardly a distance just less than 25 percent of the total height of the tank, i.e., approximately one-fourth the distance between top 28 and bottom 30. The ring-shaped exposed bottom area, defined by the bottom edge of frusto-conical shaped wall section 32 and the projection of the adjacent circular lower edge of frusto-conical shaped core 65, is traversed by crop engaging elements 67 and 68 which pass through a plane parallel to and substantially encompassing the ring-shaped area in the bottom 30 of the tank.

All mechanisms of the grinder-mixer are adapted to be powered from the tractor (not shown) utilized to transport the machine. To this end, the grinder-mixer is provided with a forwardly extending power shaft 78 (shown in FIGS. 2 and 3 only) adapted to be interconnected with a tractor power takeoff shaft in a conventional manner. The power shaft 78 is drivingly interconnected with hammermill 33 via a belt drive, the main and auxiliary transfer auger assemblies via roller chain drives, the vertical mixing assembly via a shaft 80 coupled through a universal 81 (see FIG. 2) to gearbox 73, and the discharge auger assembly via the roller chain drive for the auxiliary transfer auger and thence through a positive engaging clutch (not shown in FIG. 1) to the rear portion of the machine.

More specifically, a dirven pulley 82 on the hammermill rotor shaft 83 is driven by a belt 84 extending around drive sheave 85, mounted on a stub shaft 86. Drive connections for all powered assemblies are coupled through stub shaft 86 which is driven by power shaft 78. Fan 41 is also mounted for rotation on hammermill rotor shaft 83 and accordingly also powered by the hammermill belt drive. Stub shaft 86 drives the roller chains 87 and 88 which in turn rotatably drive shaft 80 for driving gearbox 73 and roller chain 90 which in turn drives auxiliary transfer auger 46. The main transfer auger 36 is drivingly interconnected with stub shaft 86 via roller chain 91 driven by a forward extending shaft member 92. On the rearward end of the shaft for auxiliary transfer auger 46 is a jaw clutch element of clutch 93 (see FIG. 3) whereby the shaft for horizontal discharge auger 50 may be selectively engaged. A clutch control 94 is utilized to positively engage clutch 93 by shifting shaft 95 about a fixed pivot support 96. Under conditions where the clutch horizontal discharge auger 50 is rotated via its shaft, which in effect becomes the drive shaft for the entire unloading assembly, i.e., it is coupled to chain drive 97 (FIG. 2) which rotates stub shaft 98 and stub shaft 100 which in turn, via bevel gearing, drive vertical discharge auger 53 and transverse auger 60, respectively. Thus, the power shaft 78 drivingly interconnects the fan, hammermill, mixing assembly 28, the main transfer auger 36, the auxiliary transfer auger 48 and unloading assembly 27. In view of the conventional mechanisms involved in the various drive arrangements no further detailed description will be set forth.

In operation, a tractor is connected to main power shaft 78 to rotate stub shaft 86 which in turn drives the various mechanisms of the machine. Feed material is fed into hammermill hopper 34, processed and then conveyed via transfer auger 36 through opening 38 to the interior of the tank. Material is also fed into transfer auger 36 from tube 44 by virtue of dust collector 43 which draws air through the hammermill and reroutes suspended feed particles to the tank via pipe 42. The auxiliary transfer auger also feeds material to the tank as may be desired, i.e., by means of feed concentrate hopper and auxiliary transfer auger 46, high protein additives or the like can be selectively introduced. Feed material and additives are continuously added to the tank until it is substantially full or until such time as no further material is available or desirable for introduction thereto. Materials entering through openings 38 and 48 in the tank bottom 30 are initially engaged by rigid crop engaging elements 67 and 68, and then immediately urged upwardly by virtue of spiral flighting 66 on the frusto-conical core member 65. Material is urged upwardly along flighting 66 until it reaches vertical auger housing 62 through which it is continued along its upward path until it reaches the top of vertical auger housing 62 and is discharged radially with assistance from paddle 71. The feed material then gravitates downwardly to the base of the mixing tank between the concentric circular walls of the tank and the outer surface of vertical auger housing 62. It is intermixed with incoming material being introduced into the trough-like portion of the tank whereupon the circulating material is again urged upwardly by flighting 66 at such time as it reaches the lowermost point in its circuitous path which is in the vicinity of the trough-like portion of the tank. During this mixing operation, the unloading auger assembly is deactivated by declutching positive engaging clutch 93 and opening 52 is covered by an suitable closure means (not shown) that can be slidably positioned by means of a crank arm or the like. During an unloading operation, the clsoure is removed from opening 52 and material is discharged via the discharge assembly described above. The vertical mixing assembly continues to rotate during a discharge operation to enhance circulation and movement of material and thereby more rapidly and completely empty mixed material from the tank. To further enhance this discharge operation, a unique relieved portion 101 in the lower section of the tank wall is cut away from frusto-conical section 32 to permit use of a larger unimpeded discharge opening and thus provide more rapid discharge of mixed material. Relief portion 101 provides three vertical wall segments defining the cut away portion of the tank sidewall in the immediate vicinity of opening 52, through which material is discharged. Thus, this unique structure does not interrupt the shape of the lower frusto-conical shaped wall section 32 to any great degree and thereby leaves substantially undisturbed the trough-like area and its attendant improved function.

Therefore, it is obvious that the present invention presents a simple, reliable and relatively inexpensive grinder-mixer arrangement that will effectively provide for uniform and rapid mixing. The unique configruation of the mixing assembly and tank is such that bridging is minimized and the material is rapidly and completely unloaded from the tank after a mixing operation is completed. To this end, the configuration combines the advantages of a vertical wall tank while not sacrific ing the features of a tank having an inclined sidewall. Among the many advantages of the conical shaped tank, both implicitly and explicitly set forth throughout this specification, in the added structural stability in comparison to a full cylindrical was as well as the ability to redue the overall width by partially locating the wheels and mounting assembly therefor under the conical section.

More specifically, among other things, the configuration of the present invention permits the auxiliary transfer auger to be located forward of the tank as opposed to rearward of the tank and aligned with the main transfer auger as is prevalent in prior art machines. This new arrangement obviates problem encountered in the past because of the need in prior art structure for a long unsupported main transfer auger under conditions where the auxiliary auger was an extension thereof and to the rear of the tank. In the present invention the main auger shaft is individually supported and relatively short. Likewise, because of the unique configuration of elements the auxiliary auger assembly is also operated separately and selectively during a mixing operation, which latter assembly is also utilized during an unloading operation while the main auger remains independently driven. This arrangement enhances the effectiveness of the apparatus in terms of performance and capacity while not detracting from its improved lower cost features.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. Feed material mixing apparatus comprising in combination,
  a. a frame,
  b. a tank supported by the frame, having a top, a bottom and outer wall means for confining material, said outer wall means having two sections, a first cylindrical section and an integral second frusto-conical shaped section extending downwardly and inwardly from the cylindrical member,
  c. said bottom being provided with at least two openings disposed in the bottom of said tank,
  d. means for transferring material into the tank including a hopper for receiving feed material and first transfer means for conveying the material from the hopper to the tank via one of said openings,
  e. means for unloading material from the tank including means for conveying material away from said tank via a second of said openings disposed in the bottom of said tank, and
  f. a vertical assembly mounted within the tank for mixing material fed into the tank, said assembly comprising a vertical auger housing and rotatably mounted material advancing means having a first portion comprising a vertical auger positioned at least partly within the housing for receiving material and advancing it upwardly through said housing and a second material advancing portion below and axially aligned with said first portion for advancing material upwardly to said first portion, said second portion including a vertical auger assembly having exposed flighting extending from a frusto-conical shaped core mounted for rotation with said first section and approximately equal in length to the frusto-conical shaped wall section,
  g. said tank bottom in which said openings are disposed comprising an area free of obstructions and substantially ring-shaped, said area defined by the lower edge of said integral second frusto-conical shaped section of said outer wall means, and the projection of said fursto-conical shaped core, whereby said frusto-conical shaped core, said frusto-conical shaped wall section and said ring-shaped area form a trough-like space at the bottom of said tank.

2. Feed material mixing apparatus, as set forth in claim 1, wherein said exposed flighting on the vertical auger assembly of said second portion is wound upwardly and inwardly about said frusto-conical shaped core, said flighting having a leading edge adjacent said ring shaped tank bottom area and extending outwardly from said core whereby the entire areas of said openings are traversed by said leading edge during rotation of said material advancing means.

3. Feed material mixing apparatus, as set forth in claim 2, wherein said leading edge of said auger flighting extends substantially radially from said frusto-conical shaped core to initially engage material introduced into said tank via said first transfer means.

4. Feed material mixing apparatus, as set fort in claim 1, wherein said transfer means comprise a first auger conveyor, said conveyor means comprise a second auger conveyor and said first and second auger conveyors are coaxially aligned.

5. Feed material mixing apparatus of the type set forth in claim 4 wherein drive means are provided to operate said transfer means to rotate said first auger conveyor and introduce feed material to the bottom of said tank through said one of said openings, said drive means further comprising means for coupling said second auger conveyor to said first auger conveyor to drive it in concert with said first auger conveyor for unloading material from the tank.

6. Feed material mixing apparatus, as set forth in claim 1, wherein the second section of said outer wall adjacent said third opening is relieved to permit material to be more rapidly unloaded from the tank without interfering with the function of the frusto-conical shaped portion of the outer wall with respect of the trough-like area.

* * * * *